United States Patent [19]

Hakl

[11] 4,394,364

[45] Jul. 19, 1983

[54] SEPARATION OF BORIC ACID FROM MIXTURES THEREOF WITH SULPHURIC ACID

[75] Inventor: Josef Hakl, Allschwil, Switzerland

[73] Assignee: Sandoz Ltd., Basel, Switzerland

[21] Appl. No.: 57,740

[22] Filed: Jul. 16, 1979

Related U.S. Application Data

[63] Continuation-in-part of Ser. No. 960,814, Nov. 15, 1978, abandoned.

[30] Foreign Application Priority Data

Nov. 16, 1977 [CH] Switzerland .................. 13992/77

[51] Int. Cl.$^3$ .................. C01B 35/10; C01B 17/90
[52] U.S. Cl. .................. 423/483; 423/531; 23/295 R
[58] Field of Search .................. 423/281, 283, 531; 23/295

[56] References Cited

U.S. PATENT DOCUMENTS

| | | | |
|---|---|---|---|
| 1,918,110 | 7/1933 | Kelly | 423/283 |
| 2,067,985 | 1/1937 | Sargent | 423/531 |
| 2,113,248 | 4/1938 | Berg | 423/283 |
| 2,721,562 | 10/1955 | Irvine | 423/531 |

OTHER PUBLICATIONS

Perova, A. P.; *Soviet Research in Boron Chem.*, 1949–56; Consultants Bureau, Inc.; 1961, pp. 268–271.

*Primary Examiner*—Gary P. Straub
*Attorney, Agent, or Firm*—Gerald D. Sharkin; Richard E. Vila; Thomas C. Doyle

[57] ABSTRACT

The present invention relates to a process for the separation of boric acid from boric acid-containing sulphuric acid in which the concentration of the sulphuric acid is adjusted such that the boric acid precipitates therefrom.

11 Claims, No Drawings

SEPARATION OF BORIC ACID FROM MIXTURES THEREOF WITH SULPHURIC ACID

This application is a continuation-in-part application of application Ser. No. 960,814 filed on Nov. 15, 1978 and now abandoned.

The present invention relates to a process for the separation of boric acid from boric acid-containing sulphuric acid.

The presence of boric acid in aqueous sulphuric acid which has been used in industrial processes, for example in the production of dyestuffs, creates ecological problems for the disposal of the said sulphuric acid.

It has now been found that boric acid has a greatly reduced solubility in sulphuric acid of a certain concentration, thus facilitating its separation therefrom.

Accordingly, the present invention provides a process for the separation of boric acid from boric acid-containing aqueous sulphuric acid comprising adjusting the concentration of the sulphuric acid towards 50% by weight $H_2SO_4$ (based on $H_2SO_4$ and $H_2O$) with the proviso that the final concentration lies within the range of from 20 to 65% by weight, followed by separation of the boric acid which precipitates out of the mother liquor.

It will be appreciated that once the concentration is adjusted to the desired level, the lower the temperature the greater will be the amount of boric acid crystallising out. Thus, it is preferred to cool the adjusted solution down to any temperature which is above the freezing point. However, for economical reasons a temperature of less than $-10°$ C. is not desired. The amount of boric acid precipitated at a given temperature will of course depend on the initial amount of boric acid in the sulphuric acid solution. Preferred conditions are those in which crystallization first occurs at temperatures under 100° C., more preferably at 90° C. or less. Preferably the mother liquor is cooled down to a temperature in the range of from $+60°$ C. to $-10°$ C., more preferably in the range of from 30° C. to 0° C. especially 10° C.

The solubility of boric acid is at its minimum in sulphuric acid hexahydrate (i.e. 47.5%). However it has been found that by slightly increasing the concentration to $50\pm1\%$ the amount of boric acid precipitated is greater. Thus, it is preferred that the final adjusted concentration of the sulphuric acid is within the range of from 35 to 65%, more preferably in the range of from 40 to 60%, even more preferably from 45 to 55% with $50\%\pm1\%$ being most preferred.

If the initial acid is dilute the concentration is adjusted upwardly towards 50%, by known methods, for example by adding concentrated sulphuric acid or oleum or by distilling off the water. Preferably the concentration is adjusted by distilling off the water. Distillation may be effected under reduced pressure or under normal pressure. It is preferred to operate under normal pressure so that the temperature of the mother liquor remains high enough to prevent precipitation of the boric acid during distillation. The distillation temperature is preferably under 130° C. but high enough to prevent precipitation. The boiling point of approximately 50% sulphuric acid under normal pressure is $123\pm3°$ C. (depending on the boric acid concentration). Thus, it is preferred to carry out the distillation until a boiling temperature of $123\pm3°$ C. is reached. If the boric acid content of the acid is very high, for example over 30% by weight based on $H_2SO_4$, it is possible that some boric acid might precipitate out during the distillation. Therefore it is preferred, in such cases, to conduct a stepwise procedure, i.e. distillation followed by cooling and separation and subsequently further distilling the mother liquor, cooling the same and separating the precipitated boric acid and repeating such procedure until the desired amount of boric acid has been separated. Distillation may also be effected continuously, optionally in cascades, whereby the concentrated mother liquor is transferred to a separate container where it is cooled such that the boric acid precipitates out or crystallises.

If the initial sulphuric acid is of a concentration greater than 50% the concentration thereof may be adjusted towards 50% by dilution with water. The dilution may, if necessary, be effected with external heating so that the acid is brought to a temperature whereby precipitation of the boric acid is prevented during the dilution. However, when the initial concentration of the sulphuric acid is high enough the dilution with water will produce a rise in temperature which is sufficient to prevent the precipitation of boric acid.

Separation of the precipitated boric acid may be effected in accordance with known methods. Examples of suitable methods are discontinuous or continuous filtration optionally under pressure or suction or by centrifuging.

It will be appreciated that for the separation process to give effective results the concentration of boric acid in the initial liquor must be sufficient, suitably at least 2% by weight based on the $H_2SO_4$, and that the higher the initial concentration of the boric acid the greater will be the yield of separated boric acid. Thus, advantageously the initial concentration is at least 5% by weight and can be up to the saturation limit.

The boric acid-containing sulphuric acid may also contain other inorganic and/or organic impurities, for example ammonium sulphate, Glauber's salts and/or dyestuff residues.

The total concentration of such other impurities may be up to 10% greater than the concentration of boric acid in the mother liquor. However, preferably the concentration of the said other impurities is not greater than that of the boric acid. Less soluble impurities may be separated by dilution. Other impurities can be separated before or after the process by evaporation.

The boric acid obtained may be re-used, for example in processes such as those from which the boric acid-containing sulphuric acid was originally obtained. The purified sulphuric acid may be re-used after concentration, or it may be transferred to an acid disposal unit or to a waste water purification plant.

Thus, it will be appreciated that with the process of the present invention the boric acid impurities of the sulphuric acid are removed so that the disposal of or the re-use of the sulphuric acid is facilitated whilst the boric acid itself is recovered.

The following Examples further serve to illustrate the present invention. In the Examples the percentages are by weight. The results obtained have a relative margin of error of $\pm5\%$.

EXAMPLE 1

1 Kg of boric acid-containing sulphuric acid (constitution thereof given below) in a sulphonation vessel fitted with a stirrer, thermometer and vacuum system is stirred under reduced pressure (525 mbar) for approximately 4 hours until 550 ml water are distilled off. (Distillation temperature 110° C.). Subsequently the mixture is stirred under normal pressure at 110° C. for 10 minutes. Then the mixture is cooled over the period of 4 hours to 10° C. whereby boric acid crystallises out. The suspension is further stirred for approximately 30 minutes at 10° C. and filtration is effected with a $G_3$ sintered glass funnel—filtration time c. 1 minute—filtrate thickness c. 1 cm. Excess moisture is expressed from the filtercake.

Constitution of starting material
  22% $H_2SO_4$
  2.4% $H_3BO_3$
  0.3% organic material (impurities)
  75.3% water
Product analysis
  Filtercake 41 g
    50% $H_3BO_3$
    25.9% $H_2SO_4$
    Rest water
  Distillate 550 g
    c. 0.02% $H_2SO_4$
    0.03% $H_3BO_3$
    rest water
  Filtrate 409 g
    51.8% $H_2SO_4$
    0.84% $H_3BO_3$
    0.3% organic material (impurities)
    rest water

EXAMPLE 2

1 Kg of acid of the constitution given below is stirred at atmospheric pressure for approximately 4 hours in a 2.5 liter sulphonation vessel whereby 514 ml water is distilled off (end temperature 125° C.). The contents of the vessel are cooled over the period of 4 hours with regular stirring to 10° C. wheby boric acid crystallises out. The suspension is further stirred for about 30 minutes at 10° C. and filtration is effected with a $G_3$ sintered glass funnel (filtration time about 1 minute, filtercake thickness about 1 cm), excess water being expressed from the filtercake.

Constitution of starting material
  22% $H_2SO_4$
  2.5% $H_3BO_3$
  0.3% organic material (impurities)
  75.2% water
Product analysis
  Filtercake 28 g
    7.0% $H_2SO_4$
    78.7% $H_3BO_3$
    rest water
  Distillate 514 g
    0.02% $H_2SO_4$
    0.03% $H_3BO_3$
  Filtrate 442 g
    50.5% $H_2SO_4$
    1.05% $H_3BO_3$
    0.3% organic material
    rest water

EXAMPLE 3

From 4000 g of the starting material having the same constitution as that used in Example 2 1600 g are put in a 3 liter reaction vessel which is fitted with a stirrer and a thermometer and are heated to boiling point (about 105° C.); the water which is distilled off is continuously replaced by the rest of the starting material, distillation being carried out until the boiling point of 125° C. is reached. At this stage approximately 2400 g of distillate are collected. The procedure of Example 2 is then followed and 210 g filtercake containing approximately 35% boric acid are obtained. The filtrate (1350 g) contains approximately 50% $H_2SO_4$ and less than 1% boric acid.

EXAMPLE 4

The filtrate and the first wash-filtrate obtained after preparing a disperse dyestuff is used as starting material. The two filtrates have the following constitution:
Filtrate 696.0 kg
  19.7% $H_2SO_4$ and
  2.49% $H_3BO_3$
  0.3% (inorganic impurities ammonium sulphate)
  0.4% dyestuff residues
  rest water
Wash-filtrate 48.0 kg
  10.7% $H_2SO_4$ and
  1.36% $H_3BO_3$
  trace other impurities
  rest water.

The filtrate and the wash-filtrate are put into an enamelled stirring vessel and heated with stirring. After an internal temperature of 100° C. is reached distillation begins which is continued for 22 hours. The solution at 125° C. is transferred to a second enamelled vessel and cooled with stirring to 10° C. The suspension obtained is further stirred for 30 minutes at 10° C. and is filtered under vacuum. The excess water is sucked out by employing the vacuum for a further 2½ hours. 39.8 Kg filtercake and 257.0 kg filtrate are obtained.

Product analysis
  Filtercake
    39.0% $H_2SO_4$
    30.6% $H_3BO_3$
    rest water
  Filtrate
    5.04% $H_2SO_4$
    0.90% $H_3BO_3$
    Rest water

EXAMPLE 5

100 g of an acid having the constitution given below are put in a 250 ml Erlenmayer flask, 57 g of water are added with stirring over a period of 1 minute, thereby adjusting the concentration of $H_2SO_4$ in the acid mixture to 50%. The dilution with water produces an increase in temperature of approximately 40° C. The temperature of the mixture rises quickly and reaches 50°–60° C. within seconds. Already at this temperature boric acid begins to crystallise. The content of the flask is cooled over a period of 1 hour. At 10° C. the suspension is filtered using a $G_3$ sintered glass funnel (diameter 5 cm) under vacuum.

The filter time is approximately 1 minute and the filtercake thickness is approximately 1 cm.

Constitution of starting material
  76% $H_2SO_4$
  5% $H_3BO_3$
  19% water
  Filtercake 6 g
    61.0% $H_3BO_3$
    19.5% $H_2SO_4$ rest water
Filtercake 150 g
49.8% $H_2SO_4$
0.9% $H_3BO_3$
rest water.

What is claimed is:

1. A process for the separation of boric acid from a boric acid-containing aqueous sulphuric acid mother liquor, the concentration of boric acid in said mother liquor being at least 2% by weight based on the $H_2SO_4$, comprising adjusting the concentration of the sulphuric acid towards 50% by weight $H_2SO_4$, based on $H_2SO_4$ and $H_2O$, with the proviso that the final concentration lies within the range of from 49 to 51% by weight, and with the further proviso that where the initial sulphuric acid is dilute, the concentration thereof is adjusted towards 50% by weight by distilling off water, and then separating the boric acid which precipitates out of the mother liquor.

2. A process according to claim 1, in which the adjusted solution is cooled down to any temperature above the freezing point of the mixture.

3. A process according to claim 2, in which the adjusted solution is cooled down to a temperature in the range of from +60° C. to −10° C.

4. A process according to claim 1, in which distillation is carried out under normal pressure.

5. A process according to claim 4, in which distillation is carried out until a boiling temperature of 123±3° C. is reached.

6. A process according to claim 1, in which the boric acid which precipitates out of the mother liquor is separated by filtration.

7. A process according to claim 6, in which, before filtration, the adjusted mother liquor is cooled to a temperature of from 30° C. to 0° C.

8. A process according to claim 7, in which, before filtration, the mother liquor is cooled to 10° C.

9. A process according to claim 1, in which the mother liquor contains at least 2% boric acid based on the $H_2SO_4$ and contains other inorganic impurities and/or organic impurities with the proviso that the concentration of said other impurities is not more than 10% greater than the concentration of the boric acid.

10. A process according to claim 9, in which the concentration of said other impurities is not greater than the concentration of boric acid.

11. A process for the separation of boric acid from a boric acid-containing aqueous sulphuric acid mother liquor, the concentration of sulphuric acid in said mother liquor being greater than 50% by weight and the concentration of boric acid in said mother liquor being at least 2% by weight based on the $H_2SO_4$, comprising adjusting the concentration of the sulphuric acid towards 50% by weight $H_2SO_4$, based on $H_2SO_4$ and $H_2O$, with the proviso that the final concentration lies within the range of from 45 to 55 by weight, and then separating the boric acid which precipitates out of the mother liquor.

* * * * *